United States Patent [19]
Cann

[11] 4,033,736
[45] July 5, 1977

[54] CONTINUOUS METHOD FOR MAKING ROD-LIKE SOLID CARBON DIOXIDE EXTRUSIONS

[75] Inventor: Lyle L. Cann, Peotone, Ill.

[73] Assignee: Chemetron Corporation, Chicago, Ill.

[22] Filed: Apr. 5, 1976

[21] Appl. No.: 673,772

Related U.S. Application Data

[63] Continuation of Ser. No. 515,650, Oct. 17, 1974, abandoned, which is a continuation of Ser. No. 389,255, Aug. 17, 1973, abandoned, which is a continuation of Ser. No. 284,264, Aug. 28, 1972, Pat. No. 3,786,645.

[52] U.S. Cl. .................................... 62/10; 62/35
[51] Int. Cl.² .................................... F25J 1/00
[58] Field of Search .............. 62/10, 12, 13, 35, 46, 62/47, 14

[56] References Cited

UNITED STATES PATENTS

| 1,965,922 | 7/1934 | Fievet | 62/35 |
|---|---|---|---|
| 2,071,302 | 2/1937 | Hill | 62/35 |
| 2,200,577 | 5/1940 | Lozon | 62/35 |
| 2,214,347 | 9/1940 | Post | 62/35 |
| 2,307,013 | 1/1943 | Batzle | 62/35 |
| 2,493,759 | 1/1950 | Freygang | 62/35 |
| 3,443,389 | 5/1969 | Townsend et al. | 62/35 |
| 3,670,516 | 6/1972 | Duron et al. | 62/35 |

*Primary Examiner*—Frank W. Lutter
*Assistant Examiner*—Frank Sever
*Attorney, Agent, or Firm*—N. M. Esser

[57] ABSTRACT

A novel method in accordance with the present invention comprises the formation of compacted pellets of solid phase carbon dioxide from liquid phase carbon dioxide to form snow, compressing said snow to force the same through an extrusion passageway forming elongated, rod-like extrusions of compacted solid phase carbon dioxide and exerting back pressure against the rod-like extrusion as they leave the passageways thereby stabilizing the extrusions permitting the escape of gas without fracturing the same.

4 Claims, 7 Drawing Figures

CONTINUOUS METHOD FOR MAKING ROD-LIKE SOLID CARBON DIOXIDE EXTRUSIONS

This application is a continuation of copending U.S. Pat. application No. 515,650 filed Oct. 17, 1974, now abandoned, which application is a continuation of copending DIV. Application 389,255 filed Aug. 17, 1973, now abandoned, which is a continuation of copending parent application No. 284,264 filed Aug. 28, 1972, now U.S. Pat. No. 3,786,645 dated Jan. 22, 1974.

The present invention relates to a new and improved method for making compacted pellets of solid phase carbon dioxide. More particularly, the carbon dioxide pellets produced in accordance with the present invention are ideally suitable for many and varied uses including fast freezing and other cold packaging of food stuffs wherein the pellets are mixed directly with the food, said pellets eventually sublimating into gaseous carbon dioxide.

In the past, solid phase carbon dioxide pellets have been produced by flashing liquid carbon dioxide to form snow and subsequently compacting the snow by a ram or other means into extrusion passages to form compacted solid phase carbon dioxide extrusions. One problem associated with forming solid phase carbon dioxide extrusions at high production rates in this manner has been the tendency of the newly formed extrusions leaving the extrusion passages to become unstable physically because of gaseous carbon dioxide entrapped internally of the extruded form. Carbon dioxide is a substance having a triple point wherein solid, liquid and gaseous forms can exist at the same temperature and pressure conditions. When the liquid is flashed to snow (solid phase) some of the liquid also goes into gaseous form. When the snow is compacted this gas may become entrapped internally within the rod-like extrusions and as the extrusions emerge the gas expands causing the extruded material to rupture.

The present invention provides a new and improved method of forming compacted pellets of solid phase carbon dioxide.

It is therefore an object of the invention to provide a new and improved method of the character described wherein rod-like extrusions of solid phase carbon dioxide are formed to provide such pellets.

Another object of the present invention is to provide a new and improved method for removing and carrying away gaseous carbon dioxide formed during the flashing of liquid carbon dioxide into snow.

Another object of the present invention is to provide a new and improved method of the character described wherein the outer ends of extrusion are closed during the initial stages of operation until sufficient solid phase material is present in the extrusion passages to form continuous rod-like extrusions.

Another object of the present invention is to provide a novel method of the character described wherein direct contact or back is provided for reducing the tendency of said extrusions to rupture because of gaseous carbon dioxide entrapped within the interior of the extrusions.

Another object of the present invention is to provide a new and improved extrusion method wherein an orbital moving compression is provided for compacting and extruding carbon dioxide snow into solid phase rod-like extrusions.

Another object of the invention is to provide a new and improved method for making compacted pellets of carbon dioxide snow in an extremely efficient manner.

Another object of the present invention is to provide a new and improved extrusion method wherein a moving expansion zone is provided for flashing liquid carbon dioxide into snow in synchronous relation with an orbitally moving compression zone for compacting and extruding the snow outwardly into solid phase carbon dioxide rod-like extrusions.

These and other objects and advantages of the present invention are accomplished by a new and improved method of forming compacted pellets of solid phase carbon dioxide from liquid carbon dioxide generally comprising the steps of flashing the liquid to form snow, compacting the snow and extruding the material through a confining passageway to form rod-like extrusions and exerting contact pressure against said extrusions as they emerge from the outer end of the extrusion passageways.

The rod-like extrusions break off under their own weight after leaving the extrusion passages or may be broken off by a deflector to form pellets of a desired maximum length. The pellets are somewhat porous rather than clear solid ice and have excellent heat transfer characteristics for many and varied uses including the cooling of food stuffs and the like mixed therewith.

For a better understanding of the invention, reference should be had to the following detailed description taken in conjunction with the drawings, in which.

Figure 1:
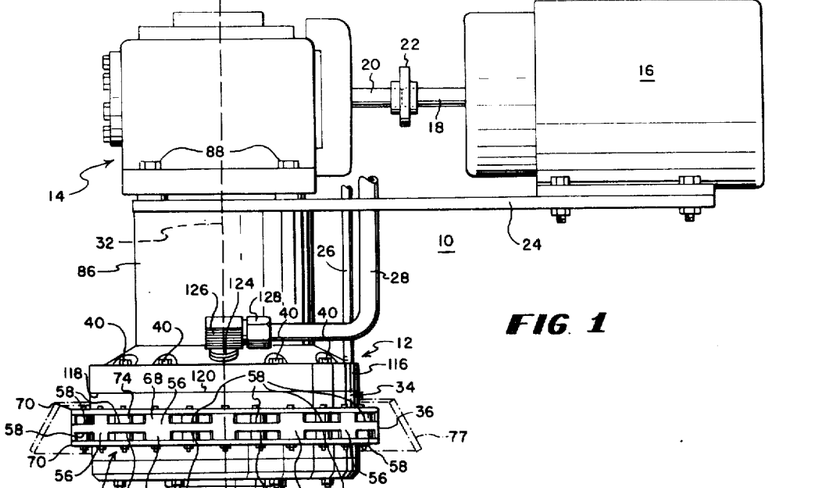
FIG. 1 is a side elevational view of a new and improved apparatus for making dry ice pellets constructed in accordance with the features of the present invention.

Referring now more particularly to the drawings, therein is illustrated a new and improved apparatus for making compacted pellets of solid phase carbon dioxide constructed in accordance with the features of the present invention and referred to generally by the reference numeral 10. The apparatus 10 includes an extrusion apparatus 12 driven by and directly coupled to the vertical output shaft (not shown) of a gear reducer 14 which is driven by an electrical motor or other prime mover 16. The motor includes a rotor shaft 18 which is directly coupled to the input shaft 20 of the gear reducer 14 by a coupling 22. The gear reducer 14 and motor 16 are mounted on the upper surface of a base plate 24 and the extrusion apparatus 12 of the pellet machine is supported from the underside of the base plate in direct coaxial alignment with the output shaft of the gear reducer 14.

Carbon dioxide in liquified form is provided under pressure to the extrusion apparatus 12 from a suitable source of supply through an input or supply line 26 and vaporous carbon dioxide or exhaust gas formed during the extrusion process in the apparatus is vented from the extrusion apparatus via a pair of vapor exhaust conduits 28.

In accordance with the present invention the extrusion apparatus 12 includes an annular extrusion chamber 30 (FIGS. 2, 3 and 4) concentrically aligned with a vertical axis 32, which axis extends through and is coaxially aligned with the output shaft (not shown) of the gear reducer 14. The annular extrusion chamber includes an annular wall formed by a plurality of circular die rings, 34, 36 and 38 secured together by a plurality of circumferentially spaced apart bolts 40. Each die ring 34, 36 and 38 is provided with a plurality of vertical passages 42 aligned with matching passages in the other rings when the rings are assembled together to form the extrusion chamber as shown best in FIGS. 2 and 4. The vertical passages 42 are spaced equidistant around the die rings and as shown in FIG. 3, the passages 42 may be spaced approximately 15° apart so that a total of 24 passages are provided. The number of passages required may be increased or decreased depending upon the size or diameter of the die rings and the mechanical strength of the materials used. One pair of passages 42a in the rings 34 and 38 are of reduced diameter and are spaced approximately 30° on opposite sides of another passage 42b in the ring 38, also of reduced diameter. The passage 42b is one of four such passages that are spaced 90° apart (as shown in FIG. 3) for use in injecting fluid into the chamber 30. One of the reduced diameter passages 42a is used for passing liquid carbon dioxide downwardly to the valving mechanism of the extrusion apparatus 12 and all of the four, quadrantally spaced, reduced diameter passages 42b are used for the distribution of carbon dioxide liquid from the valving mechanism to expansion nozzles in the extrusion chamber 30. Some of the remaining, larger diameter passages 42 spaced around and between the passages 42a and 42b are used to accommodate bolts 40 for holding the rings 34, 36 and 38 together and the other remaining passages 42 are used for the exhaust system to handle carbon dioxide vapor as will be described hereinafter.

Figure 3:
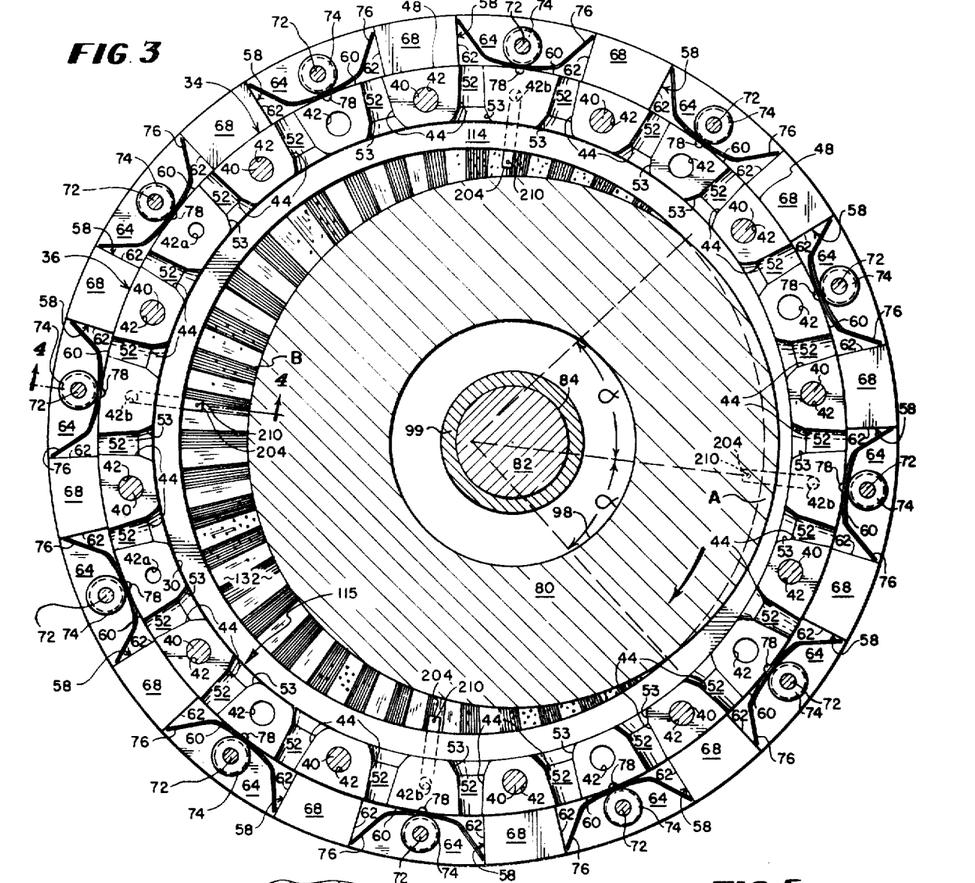
FIG. 3 is a horizontal, cross sectional view taken substantially along lines 3—3 of FIG. 2.
Figure 4:
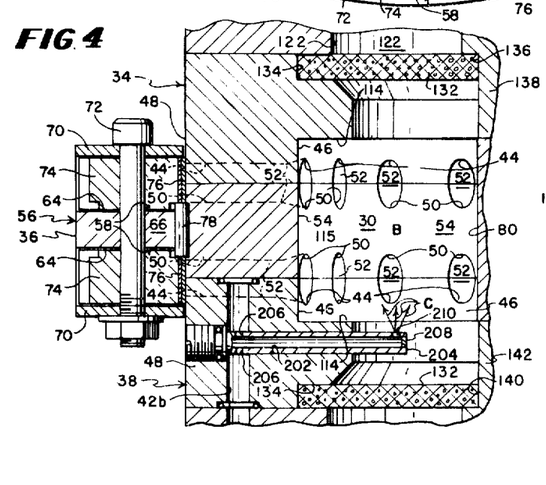
FIG. 4 is a fragmentary, vertical, cross sectional view taken substantially along lines 4—4 of FIG. 3.

The rings 34 and 38 are provided with a plurality of horizontal, radially extending extrusion passages 44, spaced between the vertical passages 42 on the respective lower and upper surfaces. The extrusion passages communicate between a cylindrical inside vertical die wall surface 46 and a concentric outside vertical die wall surface 48 (as best shown in FIGS. 3 and 4). The central or middle die ring 36 includes a plurality of matching, horizontal, radially extending extrusion passages 50 on its upper and lower surfaces. The passages 50 on the middle die ring align with facing passages 44 on the upper and lower die rings 34 and 38 to form pairs of vertically spaced apart, horizontally extending, elongated extrusion passageways 52. The passages extend radially outwardly from the annular extrusion chamber 30 between the inside and outside wall surfaces 46 and 48 of the rings 34 and 38. The middle die ring 36 includes a cylindrical inside wall surface 54 aligned with the inside wall surfaces 46 of the upper and lower die rings 34 and 36 to form a generally cylindrical, peripheral wall surface defining the annular extrusion chamber 30.

Figure 7:
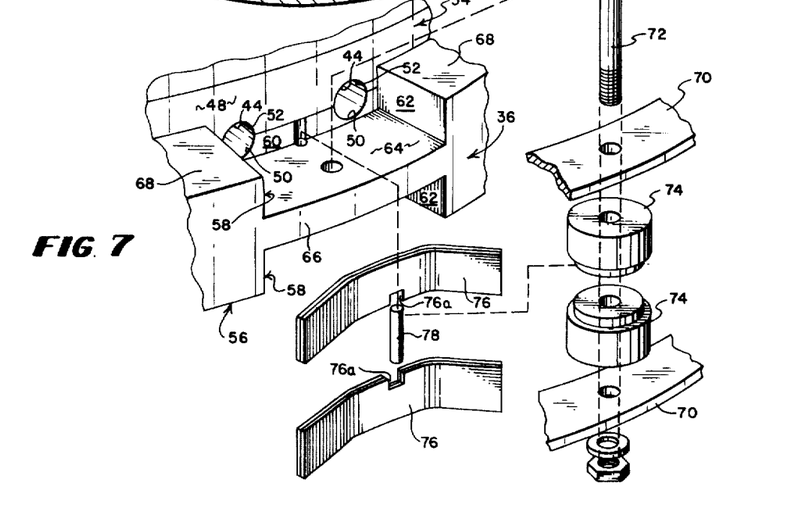
FIG. 7 is an exploded perspective view of an extrusion spring assembly in accordance with the features of the present invention.

The middle die ring 36 includes an outwardly extending annular flange portion 56 having a vertical thickness greater than the thickness or spacing between the upper and lower surfaces of the middle ring which engage the facing surfaces of the upper and lower rings 34 and 38. The outer flange 56 on the middle die ring 36 is formed with a plurality of pairs of vertically aligned spaced apart upper and lower circumferentially spaced, inwardly extending radial pockets 58. Each pocket 58 includes an inner, vertical wall surface 60 in communication with the outer end of a pair of adjacent, horizontal extrusion passages 52 as best shown in FIG. 3. The inner pocket surfaces 60 are aligned with the outer cylindrical wall surfaces 48 of the upper and lower die rings 34 and 38, and the outer open ends of the pairs of horizontal extrusion passages 52 are spaced at opposite ends of the inner pocket surfaces 60 between radially outwardly extending opposing pocket end surfaces 62 (FIG. 3). Each pocket 58 also includes a horizontal base surface 64 and the annular flange portion 56 of the middle die ring 36, provides a continuous middle portion 66 between the rows of upper and lower pockets 58. The pockets are spaced between solid, radial segments 68 and these segments project upwardly and downwardly from the respective base surfaces 64 of the pockets as best shown in FIG. 7. The upper ends of the upwardly facing ring of pockets and the lower ends of the downwardly facing ring of pockets are closed by a pair of annular washer-like ring members 70 secured to the upper and lower surfaces of the segments 68 by means of bolt and nut assemblies 72 as best shown in FIG. 4.

From the foregoing it will be seen that the extrusion passages 52 extend radially outward of the annular extrusion chamber 30 through the die rings 34, 36 and 38 and that pairs of adjacent horizontal passages terminate adjacent the opposite ends of the inner surfaces 60 of the spaced apart upper and lower outwardly opening pockets 58 formed in the middle flange portion 56 of the middle die ring 36.

As best shown in FIGS. 3, 4 and 7 each extrusion passage 52 is formed by a pair of cooperating passage surfaces 44 and 50 when the upper and lower die rings 34 and 38 are assembled with the middle die ring 36. The passages are formed with an enlarged, frustroconically tapered entry or inlet end portion 53 (FIG. 3) for compacting the carbon dioxide snow as it is forced outwardly. The frustro-conically shaped inlet portion 53 of each passage is tapered at an angle of approximately 30° with respect to the radial axis of the passage to provide a convergent effect on the snow as it is extruded outwardly. Outwardly of the inlet or entry portion of each passage, the passage wall is tapered at a much smaller angle in the order of 3° to 5°. The outer, gently tapered portion of the passages 52 are substantially longer than the entry portion and the passages reach a minimum dimension at the outer end adjacent the inner surfaces 60 of the pockets 58.

As best shown in FIGS. 3 and 4, the shanks of the bolts 72 are positioned to project vertically through the center of each pocket 58 and, in accordance with the present invention, the bolts serve as centering pins for generally cylindrical spools 74 used for supporting the central bight portions of pairs of U-shaped, back pressure, contact springs 76 (FIGS. 3 and 7). Each spring 76 includes freely deflectable opposite outer ends, which in the nondeflected state as shown in FIG. 3, project outwardly towards and contact opposing radial side surfaces 62 of the pockets 58. The springs 76 are formed of spring material of the desired thickness, strength and resiliency in order to resist the outward movement of the rod-like extrusions of solid phase carbon dioxide material exiting the outer ends of the extrusion passages 52.

In one prototype device in accordance with the invention the springs 76 were formed of commercially available, blue tempered, spring steel strip. The spring material was .025 inch in thickness, one-half inch wide with rounded edges and was cut to length from a continuous stock strip and bent to shape and notched without requiring further heat treatment. Bending of the spring material into the illustrated U-shape configuration was accomplished on a press brake and the bending angle and length of the spring strip is chosen to provide a positive bias of the outer free ends of the springs against the side surfaces 62 of approximately 2 lbs. measured at the tips of the springs when inserted and secured in place in the pockets 58 when the springs are deflected as during the making of extrusions, the springs exert a force of approximately 23 lbs. measured at the tips. It has been found that a pair of springs 76 sandwiched together was shown in FIGS. 3 and 7 are mounted in each pocket is effective to produce high quality extrusions.

The middle or right portion of each pair of springs 76 is maintained in a radially centered position within a pocket 58 by means of a centering pin 78 which is mounted in an aligned vertical passage provided in the middle portion 66 of the die ring 36. The bight portions of the upper and lower pairs of U-shaped springs 76 are formed with vertical notches 76a on the lower and upper edges respectively (FIG. 7), at the center so that the springs are seated and maintained by the upper and lower ends of the pins 78 in a centered disposition relative to each pair of extrusion passages 52 within a pocket 58. As shown in FIG. 3 each pair of springs is free to pivot about a vertical center axis as maintained by the notches 76a in the springs seated on the pin 78 and the spring pairs are backed up by the generally cylindrical support spools 74.

Initially, as the solid phase carbon dioxide snow is compacted and extruded through the tapered passages 52 it is resisted essentially only by the frictional forces of the passage walls. The outer deflectable end portions of the springs 76 act to retain this material in the form of an outwardly projecting, rod-like slug or extrusion until sufficient back pressure is built up in the extruded material formed in the extrusion passages 52. Without the springs 76 initially to begin the extrusion process, the material would simply pass out the open outer ends of the passages 52 without sufficient compaction to form pellets. The springs 76 thus facilitate the startup of the extrusion process. In addition, while maintaining back pressure on the extrusions, the springs permit vaporous carbon dioxide that emanates from within the extrusion passages to be exhausted as the extrusions reach the outer end of the passages.

The compacted snow also contains gaseous carbon dioxide. As the snow is compacted and extruded through the passages 52 to form elongated, cylindrical rod-like extrusions, the gas within the interior of the extrusions seeks to escape to the atmosphere as the gas reaches the outer end of the extrusion passages in the pockets 58. Without the springs 76 to retain the extrusion slugs the internal gas tends to expand rapidly and causes the extrusions to disintegrate or sometimes rupture, as soon as the compacted material reaches the outer end of the extrusion passages. The back pressure or restriction of outward movement of the extruded material exerted by the springs 76, which are in direct engagement with the extruded material, provide a physically stabilizing force which allows the gases to escape more slowly along the length of the rod-like extrusions as they are exiting the outer end of the extrusion passages 52. The springs 76 while exerting back pressure on the rod-like extrusions of solid carbon dioxide, permit vapor that is formed around the pellet during the compaction and extrusion process to escape to the atmosphere. As seen in FIG. 7, the passages 52 are circular in cross-section at the outer end and communicate directly with the pockets 58 which are rectangular in cross-section and this permits the gas to escape at the corners defined between the circular passages and the essentially rectangular or square cross-section defined by the pocket walls and the outer ends of the springs.

The elongated, solid phase, carbon dioxide rod-like extrusions project outwardly beyond the outer free ends of the deflected springs 76 and eventually the extrusions will break off under their own weight if they are not sooner broken off by engagement with a deflecting surface or the like. If desired, an annular cone shaped deflector shield 77 (FIG. 1) is spaced outwardly of the outer end of the extrusion passages to limit the length of extruded material and thereby form pellets having a selected maximum length. It has been observed that, if the springs are removed after the extrusion process has been initiated, the rod-like extrusions tend to break off or rupture into small pieces after exiting the outer end of the passages 52. This indicates that the springs 76 and the contact back pressure exerted thereby play an important stabilizing role in the process. It is believed that the process of extruding the material against the contact pressure of the springs 76 provides a restrictive, stabilizing force on the extruded material which holds the material together while allowing internal, vaporous carbon dioxide to escape without damage to the extruded body of material. This reduces the tendency of the material to rupture or disintegrate upon reaching the outer end of the extrusion passages 52 is reduced even though the pressure in the pockets is essentially at ambient conditions.

In accordance with the present invention, extrusion pressures in a range of 2600 to 3500 psia in the compacted snow are provided to form the solid phase rod-like extrusions of carbon dioxide in the die passages 52 in the wall of the extrusion chamber 30. Compaction of the snow is obtained by a generally cylindrical impeller 80, which is mounted for rotation on an eccentric segment 82 of a main drive shaft 84 driven by the gear reducer 14. As previously indicated, the drive shaft 84 is directly coupled to the output shaft of the gear reducer and is coaxially aligned therewith along the vertical axis 32 which is the central axis of the extrusion chamber 30 and die rings 34, 36 and 38. The impeller supporting portion 82 of the drive shaft 84 is spaced radially outward with respect to the axis 32 and parallel thereto so that the impeller 80 orbits around the axis within the extrusion chamber 30 as the main drive shaft 84 is rotated by the gear reducer and motor.

The drive shaft 84 is supported for rotation in a cylindrical housing 86 having its upper end secured to the underside of the base plate 24 by suitable means such as cap screws 88. The cylindrical shaft housing is formed with a bearing shoulder 87 adjacent the lower end and is provided with an internal, annular groove 89 spaced downwardly therefor seating a snap ring 90 which retains a bearing ring 92 preferably of the type including barrel-shaped rollers. A suitable bearing support arrangement and upper bearing (not shown) is provided adjacent the upper end of the shaft housing 86, and the upper shaft bearing provides support for the shaft 84 to prevent axial displacement thereof in the shaft housing during rotation. An annular shaft seal 96 is provided to seal between the shaft 84 and the bearing 92 adjacent the junction of the eccentric pin portion 82 and thereby prevent carbon dioxide from entering the lower end of the main shaft housing 86. The impeller 80 is formed with an enlarged axial center bore 98 larger in diameter than the outer diameter of the eccentric spindle 82 on the main drive shaft 84 and the upper and lower ends of the bore 98 are formed with enlarged shoulders 100 in order to accommodate the outer races of a pair of roller bearing rings 102 for rotatively supporting the impeller on the eccentric spindle 82. The inner races of the bearing rings are spaced apart on the spindle by a sleeve 99. The impeller 80 is retained on the eccentric shaft spindle 82 by means of a lock washer 104 and nut 106 threaded onto a lower threaded end portion of the spindle. The enlarged shoulders 100 at opposite ends of the axial bore 98 in the impeller 80 are formed in upwardly and downwardly projecting enlarged cylindrical bosses 108, which bosses provide a cylindrical curtain wall for encircling the outer races of the bearing rings 102. An upper washer 110a seals the upper bearing ring 102 while a lower washer 110b is provided adjacent the lower bearing ring 102 for sealing and an annular seal 112 is provided to seal between the lower end of the main portion of the drive shaft 84 and the upper washer 110a.

In accordance with the present invention the mid-level section of the rotary impeller 80 is cylindrical and of a thickness "T" slightly less than the vertical spacing between a pair of opposing, horizontal shoulder surfaces 114 on the upper and lower die rings 34 and 38. The upper and lower shoulder surfaces 114 together with the cylindrical surfaces 54 of the middle die ring 36 and the aligned inside surfaces 46 of the upper and lower die rings 34 and 38 provide a horizontal annular groove or track 115 around the inside wall of the extrusion chamber 30. As the impeller orbits around the chamber, a segment of the outer periphery of the impeller penetrates into the groove 115 to form a compression zone of crescent shape (designated by the letter "A" in FIG. 3) wherein the snow is compacted and extruded out the passages 52. The maximum penetration of the impeller into the groove 115 occurs at the center of the crescent shaped compression zone "A" which extends angularly on opposite sides thereof as indicated by the angles $\alpha$.

Diametrically opposite the compression zone "A" as viewed in FIG. 3, there is provided in the extraction chamber 30 an open space or expansion zone labelled "B", which zone is also crescent shaped and substantially larger than the compression zone. The expansion zone comprises a substantial portion of the volume of the annular groove 115 and the remaining volume or space between a major segment of the outer periphery of the impeller and the adjacent surface of the outer wall of the extrusion chamber. As viewed in FIG. 3 it will be seen that the volume of the compression zone "A" is smaller than the expansion zone "B" so that the carbon dioxide snow may be formed by the flashing of liquid carbon dioxide injected directly into the expansion zone at several spaced apart locations therein. Because of the direct injection of flashed carbon dioxide in the extrusion chamber 30, the appparatus does not require a large, voluminous snow horn and does not rely on gravity feed to fill the extrusion chamber with snow. The impeller orbits to compact and compress the snow into the groove 115 and forces the material into the entrance of the tapered extrusion passages 52. As further compaction takes place, the compacted snow is extruded outwardly through the outer, slightly tapered section of the extrusion passages 52 until rod-like extrusions of solid phase carbon dioxide are pushed out into the pockets 58. Because a segment of the outer periphery of the impeller 80 penetrates outwardly into the groove 115 between the upper and lower shoulder surfaces 114, the carbon dioxide snow in the extrusion chamber 30 is entrapped in the compression zone within the groove and is thus subjected to extremely high pressure and compaction force during extrusion outwardly through the tapered passages 52.

The compression zone "A" moves around the extrusion chamber 30 as the impeller 80 orbits and the leading and trailing edges of the zone precede and follow the edges of the larger expansion zone "B" which is partially filled with carbon dioxide snow. Each orbit of the impeller 80 causes the formation of additional rod-like extrusions in the passages 52 adjacent the compression zone "A" and the extrusion or outward push on each rod-like member takes place intermittently rather than continuously. The extrusions thus grow in length intermittently each time the impeller 80 makes an orbit as the shaft 84 makes one complete revolution. Sealing engagement between the upper and lower annular ring shoulder surfaces 114 of the groove 115 and the upper and lower faces of the mid-level portion of the impeller 80 provide the compacting entrapment of the snow in the compression zone "A" and this results in a mobile, orbiting, localized zone of extremely high compaction pressure in the extrusion chamber 30 which followed and preceded by the relatively low pressure, larger volume expansion zone "B". Flashing or expansion of the liquid carbon dioxide into the low pressure expansion zone "B" in the chamber 30 develops carbon dioxide snow and this now partially fills the chamber.

In accordance with the present invention the annular die rings 34, 36 and 38 are supported from the lower end of the main shaft housing 86 by means of an outwardly extending annular flange structure 116 welded or otherwise secured on the lower end of the housing. The flange structure 116 includes a horizontal, lower annular face 118 which is adapted to abut against an upper face 120 on the upper die ring 34. The flange structure 116 provides a closure for the upper end of the annular extrusion chamber 30 and is formed with a plurality of vertical passages 42 aligned to match those in the die rings for accommodating the bolts 40. In addition to the passages 42 for the bolts 40, a single passage 42a (FIG. 2) is provided to deliver liquid carbon dioxide from the inlet supply conduit 26 into the downwardly extending aligned vertical passages 42a in the respective upper, middle and lower die rings 34, 36 and 38.

Figure 2:
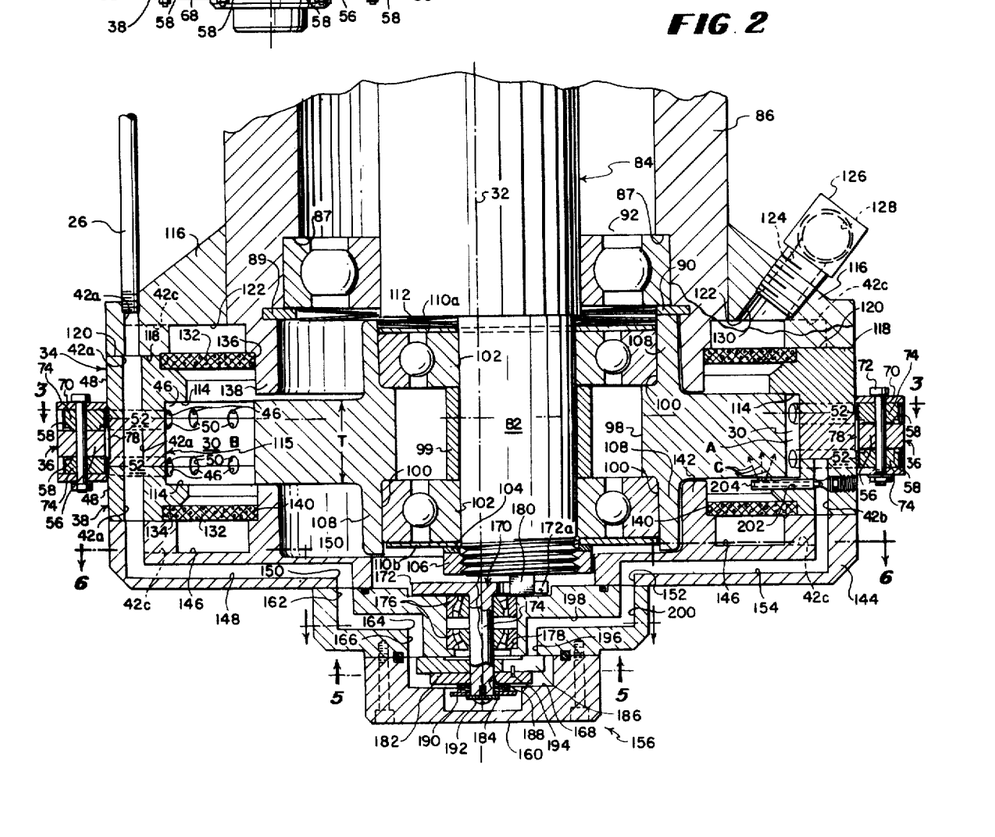
FIG. 2 is a fragmentary, vertical cross sectional view taken substantially along lines 2—2 of FIG. 6.

The underside of the flange structure 116 and the outer portion of the lower end of the tubular housing 86 are formed with an annular groove or exhaust manifold therein designated as 122 in FIGS. 2 and 4. The groove serves as a manifold for collecting and exhausting the vaporous carbon dioxide formed during the flashing and expansion process in the extrusion chamber 30 and released during the initial stages of compaction of the snow. The exhaust groove is in direct communication with a pair of exhaust fittings 124 mounted on diametrically opposite sides of the flange structure 116 and the fittings are connected to elbows 126 (FIGS. 1 and 2). The elbows are connected to the exhaust conduits 28 via coupling units 128 (FIG. 1) and as illustrated in FIG. 1, the pair of exhaust fittings 124 are positioned at 90° angles with respect to and on opposite sides of the inlet supply line 26. The exhaust lines are substantially larger in size than the supply line in order to handle a higher volume flow rate of vaporous carbon dioxide. The exhaust fittings 124 are threaded into apertures formed in the flange structure 116, and a pair of short passages 130 (FIG. 2) are provided to communicate between the exhaust fittings and the upper surface of the annular groove 122 which comprises the upper exhaust manifold for the extrusion apparatus 12.

In order to prevent the solid carbon dioxide or snow in the extrusion chamber 30 from entering the annular exhaust manifold 122, the extrusion assembly 12 is provided with a pair of annular filter rings 132 disposed above and below the die rings 34 and 38 and adapted to permit passage of vaporous carbon dioxide while filtering out or limiting the passage of solid phase carbon dioxide snow. The annular filter rings 132 are seated with their outer periphery in annular recesses or shoulders 134 formed in the die rings 34 and 38. The upper filter ring 132 has an inner peripheral edge seated in a shoulder 136 formed in a downwardly extending circular wall portion 138 formed at the lower end of the tubular shaft housing 86. The annular extension wall 138 is adapted to encircle the upwardly projecting boss 108 on the impeller 80 and the lower end of the extension wall terminates adjacent the level of the annular, upper shoulder surface 114 of the groove 115.

The lower filter ring 132 is seated around its inner periphery in an annular shoulder 140 formed in an upwardly extending annular ring 142 which is similar in dimension and configuration to the ring 138 formed at the lower end of the shaft housing 86. The ring 142 is adapted to cooperate with the lower, downwardly depending boss 108 on the impeller 80 and is integrally formed to extend upwardly from a circular bottom wall or closure plate 142 secure to the underside of the lower die ring 38 by the bolts 40.

Figure 6:
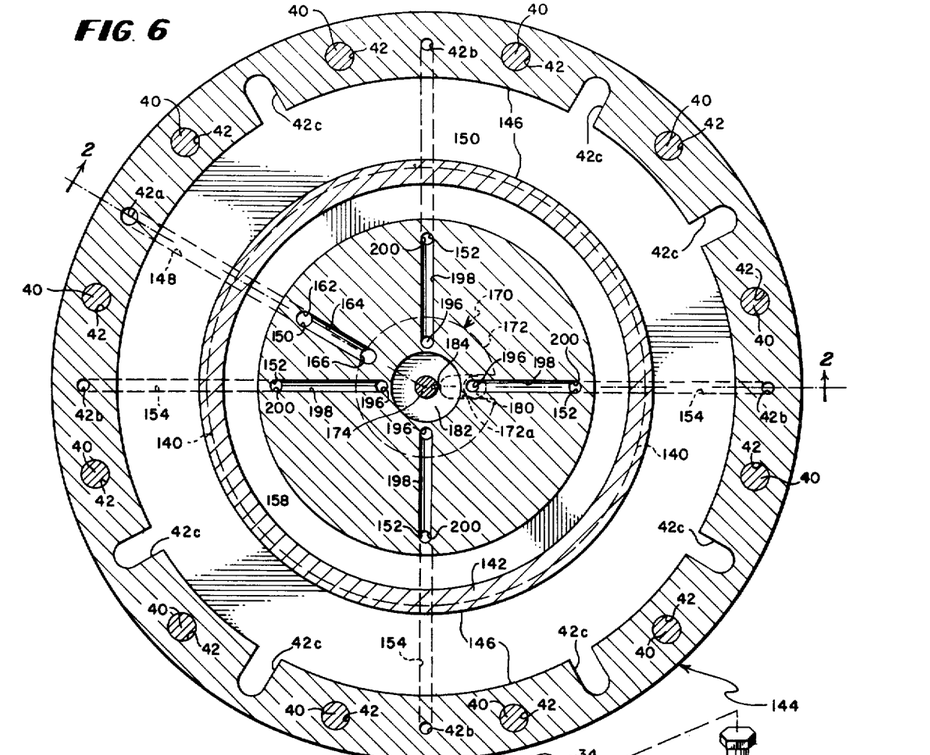
FIG. 6 is a horizontal, cross sectional view taken substantially along lines 6—6 of FIG. 2.

As best shown in FIGS. 2 and 6 the upwardly extending ring 142 forms the inside wall of a lower, annular groove or vapor exhaust manifold 146, which groove is similar in size and shape to the upper manifold or groove 122 above the upper filter ring 132. Carbon dioxide vapor formed during the flashing process and during initial stages of compaction in the annular extrusion chamber 30 may pass freely in an upward or downward direction from the chamber through the respective upper and lower filter rings 132. This exhaust vapor is collected in the manifold grooves 122 and 146, respectively, and is delivered to the exhaust conduit 28. As viewed in FIG. 6 a circular lower closure plate 144 for the extrusion chamber 30 is provided with a plurality of circumferentially spaced apart passages 42 matching those of the die rings for accommodating the bolts 40 which secure the assembled rings 34, 36 and 38 and the closure plate with the upper flange structure 116 on the shaft housing 86.

In an embodiment constructed in accordance with the features of the present invention, the filter rings 132 were formed of perforated stainless steel material, approximately .031 inch in thickness and were formed with V-shaped corrugations therein extending generally radially around the ring with respect to the axis 32 as best shown in FIG. 3. The V-shaped corrugations in the filter rings are formed at approximately a 45° angle with respect to the horizontal, and the width of the corrugations enlarges toward the outer periphery of the ring due to the radial orientation of the corrugations. The sheet material used for the filter rings is formed with perforations of approximately .030 inch in diameter and it has been found that rings of this style serve well to prevent the carbon dioxide snow from passing vertically out of the annular extrusion zone in the expansion region "B" as the impeller 80 orbits. The surfaces 114 of upper and lower die rings 34 and 38 shield the filter rings 132 from the pressure in the compaction zone "A", because of the penetration of the impeller 80 within the anular groove 115 on the inside of the die wall. The filter rings 132 are thus not subjected to the extremely high extrusion pressure developed for compaction and extrusion and this feature permits a relatively light weight filter ring structure to be utilized to effectively block the flow of solid carbon dioxide snow while permitting the ready escape passage of vaporous carbon dioxide.

Referring to FIGS. 2 and 4, the upper and lower edges on the outer periphery of the mid-level section of the impeller 80 that penetrates the groove 115 between the ring surfaces 114 is provided with sharp corners in order to provide shearing or cutting action on the snow as the impeller orbits. The snow contained within the expansion zone "B" above the upper ring surface 114 beneath the upper filter ring 132, provides a filter medium itself for the carbon dioxide vapor moving upwardly and the filter ring 132 prevents the snow cake of solid phase material from passing out to exhaust. The same action prevails in the area above the lower filter ring 132 below the lower ring surface 114 where the annular snow cake form as a lower vapor filter and the metal filter ring 132 prevents the snow from moving into the lower exhaust groove 146. The sharp peripheral edges of the upper and lower surfaces on mid-level section of the impeller 80 are continuously shearing off the surfaces of the upper and lower filter cakes to provide a clean, open entry surfaces for the gases escaping upwardly and downwardly from the mid-level of the extrusion chamber into the exhaust manifold grooves 122 and 146. In this manner, plugging up or glazing over of the filter cake surfaces which engage the upper and lower surfaces of the impeller mid-section in avoided and the filter cakes of carbon dioxide snow are maintained in a condition to readily pass the vapor toward the metal filter rings.

The passages 42 in the bottom closure plate 144 extend completely through the plate so that nuts and washers may be provided on the lower end of the bolts 40 to secure the die rings, flange structure and plate together. The passages 42 in the flange structure 116, the die rings 34, 36 and 38 and bottom closure plate 144 are aligned to match one another and the liquid carbon dioxide inlet passage 42$a$ in the die rings is adapted to communicate with a passage 42$a$ formed in the bottom closure plate 144 which terminates short of the lower surface thereof. Similarly, the distribution passages 42$b$ in the lower die 38 is adapted to communicate with four passages 42b formed in the bottom closure plate 144 spaced 90° apart and terminating short of the lower surface of the plate.

In order that the exhaust vapor collected in the lower groove or manifold 146 may flow upwardly into the upper groove or manifold 122 through selected ones of the passages 42 in the die rings which do not contain bolts 40, the bottom closure plate 144 is formed with a plurality of fingerlike, radially outwardly extending recesses 42c for passing the vapor collected in the groove 146 to the lower open ends of the aligned open passages 42 in the die rings. Similar finger-shaped grooves 42c are provided in the flange structure 116 to bring the gases radially inward into the upper collecting manifold or groove 122 for exhaust. From the foregoing description it will be seen that the novel structures assembled together to form the annular extrusion chamber 30 including the flange structure 116, the die rings 34, 36 and 38, and the bottom closure plate 144 provide a unique system for directing the flow of liquid and gaseous carbon dioxide to desired locations.

Liquid carbon dioxide from the line 26 flows downwardly through aligned passages 42a in the flange structure 116, the die rings 34, 36 and 38 and into the passage 42a in the bottom closure plate 144. From this point the liquid flows radially inwardly via a passage 148 which terminates in a port 150 on the underside of the bottom closure plate.

Liquid carbon dioxide which is to be injected into the annular extrusion chamber 30 in synchronism with the orbiting movement of the impeller 80 is distributed into selected ones of four, quadrantally spaced ports 152 provided on the lower surface of the bottom closure plate. The ports 152 are positioned at the inner end of radially outwardly extending distribution passages 154 arranged at 90° angles to one another and terminating at their outer end in communication with the closed lower end of the vertical passages 42b. Liquid from the ports 152 flows upwardly through the aligned passages 42b in the lower die ring 38, for injection into the expansion zone "B" ahead and behind the compression zone "A" of the orbiting impeller.

Figure 5:
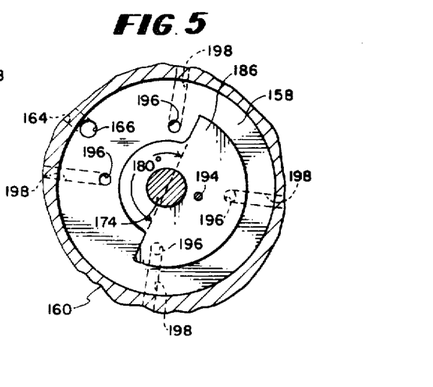
FIG. 5 is a fragmentary, horizontal, cross sectional view taken substantially along lines 5—5 of FIG. 2.

In order to synchronize the injection of liquid carbon dioxide with the position and movement of the orbiting impeller 80 around the annular extrusion chamber 30, the apparatus 12 includes a distributor assembly 156 (FIG. 2) which comprises an upper distributor plate 158 and a lower valve housing 160, both secured in coaxial alignment with the central axis 32 of the extrusion apparatus. The distributor plate is formed with a vertical passage 162 adapted to communicate with the port 150 on the underside of the bottom closure plate 144, as best shown in FIGS. 2 and 6 and the passage 162 terminates short of the underside of the distributor plate 158. The passage 162 is in communication with the outer end of a radially inwardly extending horizontal feed passage 164 which is in communication at its inner end with a downwardly extending vertical passage 166 for directing fluid downwardly into an annular valve chamber 168 formed in the valve housing 160 (FIGS. 2 and 5).

Liquid carbon dioxide at the desired supply pressure of approximately 210 to 250 psia is supplied to the extrusion apparatus 12 via the inlet line 26 and flows downwardly through the aligned vertical passages 42a in the flange structure 116 and the die rings 34, 36 and 38 into the passage 42a in the bottom closure plate 144. The liquid is then directed radially inwardly via the passage 148 and then downwardly through the port 150 and passage 162 in the valve plate 158. The liquid flows radially inwardly in a horizontal path through the passage 164 and then downwardly through the vertical passage 166 to fill the valve chamber 168 formed inside the valve housing 160.

In accordance with the present invention a valve rotor assembly 170 comprising an upper rotor disk 172 and interconnected shaft 174 is mounted for rotation in coaxial alignment with the main shaft axis 32. The valve rotor shaft is supported by a pair of bearings 176 mounted in a vertical bore 178 formed at the center of the distributor plate 158. The valve rotor is driven in synchronism with the impeller 80 by means of a short, downwardly extending spindle extension 180 formed on the lower end of eccentric spindle 82 of the main drive shaft 84. The spindle extension projects downwardly in driving engagement with the dish 172 into a radial slot 172a formed in the outer edge of the disk. As the spindle 82 of the drive shaft 84 orbits, the valve rotor 170 is driven in synchronism therewith. The lower end of the valve shaft 174 extends downwardly into the valve chamber 168 and a disk 182 is keyed to rotate with the shaft by means of a conventional "Woodruff" type key 184. The disk 182 is drivingly interconnected with a rotating valve member 186 mounted on the shaft 174 and biased upwardly against a smooth face on the underside of the distributor plate 158 by means of a helical spring 188 coiled around a lower end portion of the shaft. The spring is secured between the lower face of the disk 182 and the upper face of a retaining washer 190 by a cap screw or equivalent 192 threaded into the lower end of the rotor shaft 174. The valve member 186 and drive disk 182 are drivingly interconnected to each other by an eccentric drive pin 194 as best shown in FIG. 5 so that in normal operation, the valve member 186 is keyed to rotate in synchronism with the rotative position of the impeller 80 and the compression zone "A".

In accordance with the present invention, the liquid carbon dioxide which flows into the valve chamber 168 is distributed both ahead of and behind the compression zone "A" as the impeller orbits around the annular extrusion chamber 30 and the distribution of liquid is controlled by means of the valve member 186. As shown in FIG. 5 the valve 186 includes a large radius, port closing, peripheral portion or land, which includes a segment occupying approximately 180° of its periphery, and a small radius, port opening, section occupying the remaining 180° of periphery. The liquid carbon dioxide in the valve chamber 168 is controlled to flow upwardly through four equilaterally spaced ports 196 opening on the lower face of the valve distributor plate 158 as best shown in FIG. 2 and these ports are spaced 90° apart at a radius less than that of the valve closing land portion of the valve 186 but greater than the radius of the valve opening section of the valve. Because there are four equilaterally spaced distribution ports 196 that are controlled by the rotating valve 186, and because the valve opening segment occupies half of the total periphery, at any given time two ports will be open for the distribution of fluid to the extrusion chamber 30 and two ports will be closed. This means liquid will flow to the chamber through only two of the four available passages 42b at any given instant. The four distribution ports 196 are in communication with the inner ends of a plurality of radially outwardly extending horizontal passages 198 in the valve distributor plate 158 and these passages are arranged with 90° angular spacing between them around the axis 32. The outer ends of the passages 198 are in communication with vertical passages 200, the upper ends of which are in communication with the ports 152. The ports 152 are in communication with the inner ends of the radial distribution passages 154, which in turn communicate with the four, quadrantally spaced, vertical distribution passages 42b formed in the bottom closure plate 144 and aligned with the passages 42b in the die ring 38.

The flow of liquid carbon dioxide is thus directed into the valve chamber 168 and is distributed by the valve 186 to flow out through only two of the four radial distribution passages 198 and 154 which lead to the four vertical passages 42b in the die ring 38. Which ones of the passages are being supplied with fluid is dependent upon the precise position of the orbiting impeller 80 and the valve 186 which is keyed to rotate in synchronism therewith.

Liquid carbon dioxide is flashed into the chamber 30 in advance of and behind the compression zone "A" into the larger expansion zone "B". The impeller 80 and orbiting radius thereof are dimensioned so that the compression zone "A" occupies a smaller angular range (for example approximately 48° on either side of the point of maximum compression or penetration of the impeller into the groove or track 115) than does the larger exapansion zone "B" and fluid is only injected into the expansion zone.

In accordance with the present invention the lower die ring 38 is provided with four radially inwardly directed, horizontal injection passages 202 (FIG. 4), which passages are in communication with the vertical passages 42b. Within each of these passages there is mounted an injection nozzle structure 204 comprising a hollow tubular body including an enlarged outer end portion having external threads thereon for threaded engagement within an enlarged outer end portion of the passages 202 outboard of the vertical passages 42b.

The hollow tubular body of the nozzle structures 204 are formed with openings 206 adjacent the outer end for permitting the fluid in the passages 42b to enter the nozzles. The fluid enters the injection nozzles adjacent the outer end through the openings 206 and is directed radially inwardly through the hollow body of the nozzles toward the inner end. The inner ends are closed by end plugs 208 (FIG. 4) and each nozzle is provided with a discharge orifice 210 adapted to flash the high pressure liquid carbon dioxide into the low pressure expansion zone "B" in the upward direction as shown by the arrows "C" (FIGS. 4 and 2). The outer end portions of the nozzle structure 204 are identified so that when inserted in the bores 202 the nozzles may be properly orientated so that the orifices 210 will discharge upwardly as shown in the drawings. As previously described only two of the nozzles will be flashing liquid carbon dioxide into the crescent shaped expansion zone "B" at any given instant to fill the expansion zone with carbon dioxide snow.

As the impeller 80 orbits, the valve 186 controls the flow to the nozzles 204 which are spaced quadrantally around the annular extrusion chamber 30. The crescent shaped expansion zone "B" is continuously being charged with carbon dioxide snow flashed from the discharge orifices 210 of the injection nozzles 204. Liquid carbon dioxide is supplied to the extrusion apparatus 12 at an operating pressure range of approximately 210 to 250 psia. As this liquid is flashed via the nozzle orifices 210 into the expansion zone "B" ahead of and behind the moving compression zone "A" defined by the impeller, the pressure is rapidly reduced as expansion occurs. The material passes through the triple point and a mixture of snow and vapor results at a pressure slightly above one atmosphere. As the compression zone "A" orbits around the annular extrusion chambers 30, the snow is compacted and the pressure is raised rapidly as the snow enters the extrusion passages 52. As the compacted snow is forced outwardly through the extrusion passages 52 the pressure gradient drops toward ambient pressure conditions at the outer end at slightly above atmospheric as the material exits the extrusion passages into the pockets 58. This pressure drop occurs rapidly in the extrusion process but is intermittent as previously described. A slight amount of pressure increase is shown by the stabilizing contact back pressure exerted on the rod-like extrusions by the outer free ends of the springs 76. This slight increase in pressure by the springs 76 results in a stable extrusion of solid phase carbon dioxide.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of continuously forming rodlike extrusions of solid phase carbon dioxide from liquid carbon dioxide, comprising the steps of:
   a. Flashing liquid carbon dioxide in an expansion zone to form solid and gaseous carbon dioxide, said solid carbon dioxide being collected in an extrusion chamber which communicates with an outlet of said expansion zone and an inlet of an extrusion passage,
   b. Filtering said gaseous carbon dioxide from within said extrusion chamber and said extrusion passage through filter means communicating with said extrusion chamber,
   c. Forcing said solid carbon dioxide into said extrusion passage by a rotary forcing means, against a constant back pressure produced by a spring means which spans the outlet of said extrusion passage, and
   d. Extruding a rod-like extrusion of solid carbon dioxide past said spring means in response to force produced by said forcing means.

2. The method of claim 1 wherein said forcing step and said extruding step is accomplished by establishing a moving compression zone formed to orbit around an axis and said extruding is accomplished in a direction radially outward of said axis, said contact pressure resiliently resisting the extrusion.

3. The method of claim 2 including the step of removing a portion of the gaseous carbon dioxide from said expansion zone in said extrusion chamber in advance of said moving compression zone.

4. The method of claim 2 wherein said flashing step comprises a succession of spray injections of liquid carbon dioxide into said expansion zone in said extrusion chamber in advance of said orbitally moving compression zone in the direction of rotation of said zone around said axis.

* * * * *